(12) United States Patent
Miyahara et al.

(10) Patent No.: US 6,474,680 B1
(45) Date of Patent: Nov. 5, 2002

(54) SIDE AIR BAG APPARATUS OF VEHICLE

(75) Inventors: Takehiko Miyahara, Kanagawa-ken (JP); Shusaku Tajima, Kanagawa-ken (JP)

(73) Assignee: Nissan Motor Co., Ltd., Kanagawa-ken (JP)

( * ) Notice: Subject to any disclaimer, the term of this patent is extended or adjusted under 35 U.S.C. 154(b) by 0 days.

(21) Appl. No.: 09/652,142

(22) Filed: Aug. 31, 2000

(30) Foreign Application Priority Data

Aug. 31, 1999 (JP) ............................................ 11-245493

(51) Int. Cl.⁷ ............................ B60R 21/22; B60R 21/26
(52) U.S. Cl. ...................................... 280/730.2; 280/736
(58) Field of Search .......................... 280/730.1, 730.2, 280/736, 740, 751

(56) References Cited

U.S. PATENT DOCUMENTS

| 3,602,527 A | * | 8/1971 | Goetz et al. ................. 280/740 |
| 3,807,755 A | * | 4/1974 | Mason, Jr. ................... 280/736 |
| 5,884,937 A | * | 3/1999 | Yamada .................... 280/730.2 |
| 6,070,903 A | * | 6/2000 | Beisswenger et al. ....... 280/736 |
| 6,073,961 A | * | 6/2000 | Bailey et al. ............ 280/730.2 |
| 6,106,007 A | * | 8/2000 | Kretschmer et al. ...... 280/730.2 |
| 6,186,536 B1 | * | 2/2001 | Fischer .................... 280/730.2 |

FOREIGN PATENT DOCUMENTS

JP      10-181512      7/1998

* cited by examiner

*Primary Examiner*—Peter C. English
(74) *Attorney, Agent, or Firm*—McDermott, Will & Emery

(57) ABSTRACT

A side air bag apparatus of a vehicle in accordance with the invention is provided with: an air bag main body arranged along an inner side of an occupant room extending from a pillar to a side roof rail in its folded state and capable of being deployed downward; an inflator injecting gas and capable of inflating the air bag main body due to the gas so as to deploy the air bag main body downward, an upper end portion of the inflator being positioned lower than a head portion of an occupant; and a gas communication member capable of introducing the gas injected from the inflator to the air bag main body and capable of being deformed due to an excessive input from its external portion.

14 Claims, 3 Drawing Sheets

SIDE AIR BAG APPARATUS OF VEHICLE

BACKGROUND OF THE INVENTION

The present invention relates to a side air bag apparatus of a vehicle, and more particularly to a side air bag apparatus for restraining a head portion or the like of an occupant at a time of a side collision of a vehicle.

As a side air bag apparatus of a vehicle, there is a structure provided along a side roof rail, which is arranged in a portion corresponding to a head portion of an occupant, in a vehicle body.

Japanese Patent Application Laid-Open Publication No. 10-181512 discloses a side air bag apparatus of a vehicle.

SUMMARY OF THE INVENTION

In accordance with a consideration of inventors of the present invention, there is a case that the side air bag apparatus is structured such that a bag-like air bag main body is provided between a side roof rail and a garnish covering the side roof rail in a folded state thereof. In the case mentioned above, an end portion of the air bag main body is connected to an inflator arranged between a pillar and a resin pillar garnish covering the pillar at the side of an occupant room. Then, the structure is made such that at the time of a side collision, gas is injected into the air bag main body from the inflator so as to downward inflate and deploy the air bag main body in a curtain shape, thereby restraining so as to protect the head portion of the occupant.

In this case, since the inflator arranged at the pillar side is structured so as to inject the gas due to a reaction of an agent therewithin or the like, a rigidity of the inflator itself is increased so as to resist against a pressure thereof.

Accordingly, in order to more effectively absorb an impact energy applied to the head portion of the occupant, a structure is provided with a plurality of ribs formed on a back surface of a resin pillar garnish covering the inflator. The ribs are deformed if the head portion of the occupant is brought into contact with a portion of the pillar garnish corresponding to the inflator.

However, in the structure mentioned above, since it is necessary to form a plurality of ribs on the back surface of the pillar garnish covering the pillar at the side of the occupant room, a clearance between the inflator and the pillar garnish is increased correspondingly. Accordingly, the pillar garnish protrudes to the inner side of the occupant room, thereby reducing the occupant room interior space.

An object of the present invention is to provide a side air bag apparatus of a vehicle which has no necessity of forming a plurality of ribs on a back surface of a pillar garnish or the like and can well secure an occupant room interior space.

In accordance with the present invention, there is provided a side air bag apparatus of a vehicle comprising: an air bag main body arranged along an inner side of an occupant room extending from a pillar to a side roof rail in a folded state thereof and capable of being deployed downward; an inflator injecting gas and capable of inflating the air bag main body due to the gas so as to deploy the air bag main body downward, an upper end portion of the inflator being positioned lower than a head portion of an occupant; and a gas communication member capable of introducing the gas injected from the inflator to the air bag main body and capable of being deformed due to an excessive input from an external portion thereof.

In other words, in accordance with the present invention, there is provided a side air bag apparatus of a vehicle comprising: an air bag main body arranged along an inner side of an occupant room extending from a pillar to a side roof rail in a folded state thereof and capable of being deployed downward; an inflator injecting gas and capable of inflating the air bag main body due to the gas so as to deploy the air bag main body downward, an upper end portion of the inflator being positioned lower than a head portion of an occupant; and gas communication means capable of introducing the gas injected from the inflator to the air bag main body and capable of being deformed due to an excessive input from an external portion thereof.

DETAILED DESCRIPTION OF THE PREFERRED EMBODIMENT

Figure 1:
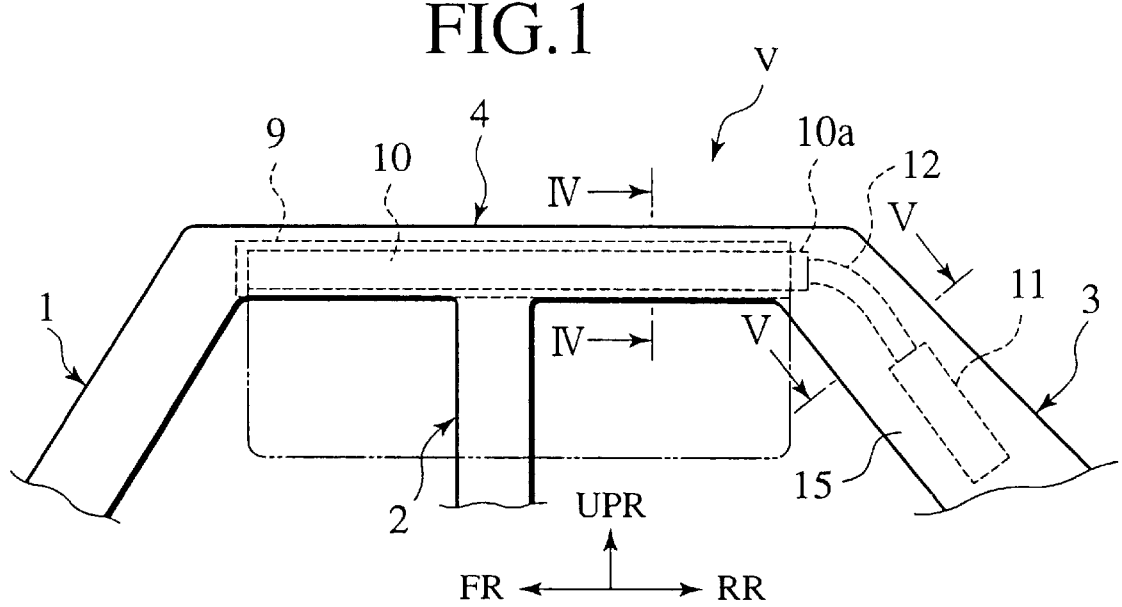
FIG. 1 is a side view showing a main structure of an inner portion of an occupant room to which a side air bag apparatus of a vehicle in accordance with an embodiment of the present invention is mounted.

Described herein are embodiments of a side air bag apparatus of a vehicle in accordance with the present invention with reference to FIGS. 1 to 5. As used herein, an arrow FR in the drawings denotes a front direction of a vehicle V, an arrow RR denotes a rear direction of the vehicle V, an arrow UPR denotes an upper direction of the vehicle V and reference symbol R denotes an occupant room or vehicle cabin.

As is representatively shown in FIG. 1 viewing an upper portion of the vehicle V as to an inner side of the occupant room R, reference numeral 1 denotes a front pillar, reference numeral 2 denotes a center pillar and reference numeral 3 denotes a rear pillar.

A side roof rail 4 having a closed cross sectional structure along a longitudinal direction is formed in upper portions of the respective pillars 1, 2 and 3.

Figure 4:
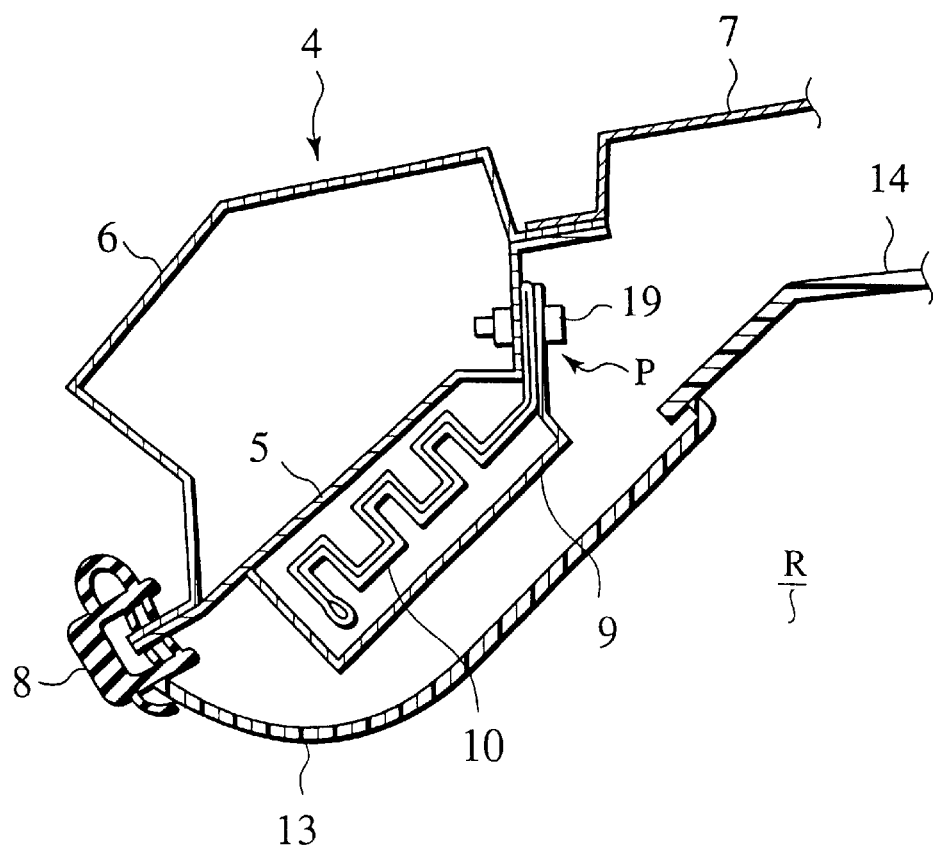
FIG. 4 is a cross sectional view taken along a line IV—IV in FIG. 1.

As shown in FIG. 4, the side roof rail 4 is constituted by a rail outer panel 6 and a rail inner panel 5.

An end portion of a roof panel 7 is bonded to an upper end portion of the side roof rail 4. A weather strip 8 for securing a sealing performance with respect to a door (not shown) is mounted to a lower end portion of the side roof rail 4.

A cover 9 formed in a substantially C shape and having a lower end portion close to the rail inner panel 5 is provided in an upper portion of the rail inner panel 5.

A bag-like air bag main body 10 is received within the cover 9 in a folded state. An upper portion of the air bag main body 10 is commonly fastened to the rail inner panel 5 by a bolt 19 in a mounting portion P of the cover 9. A predetermined number of the mounting portions P are provided in a longitudinal direction.

Figure 2:
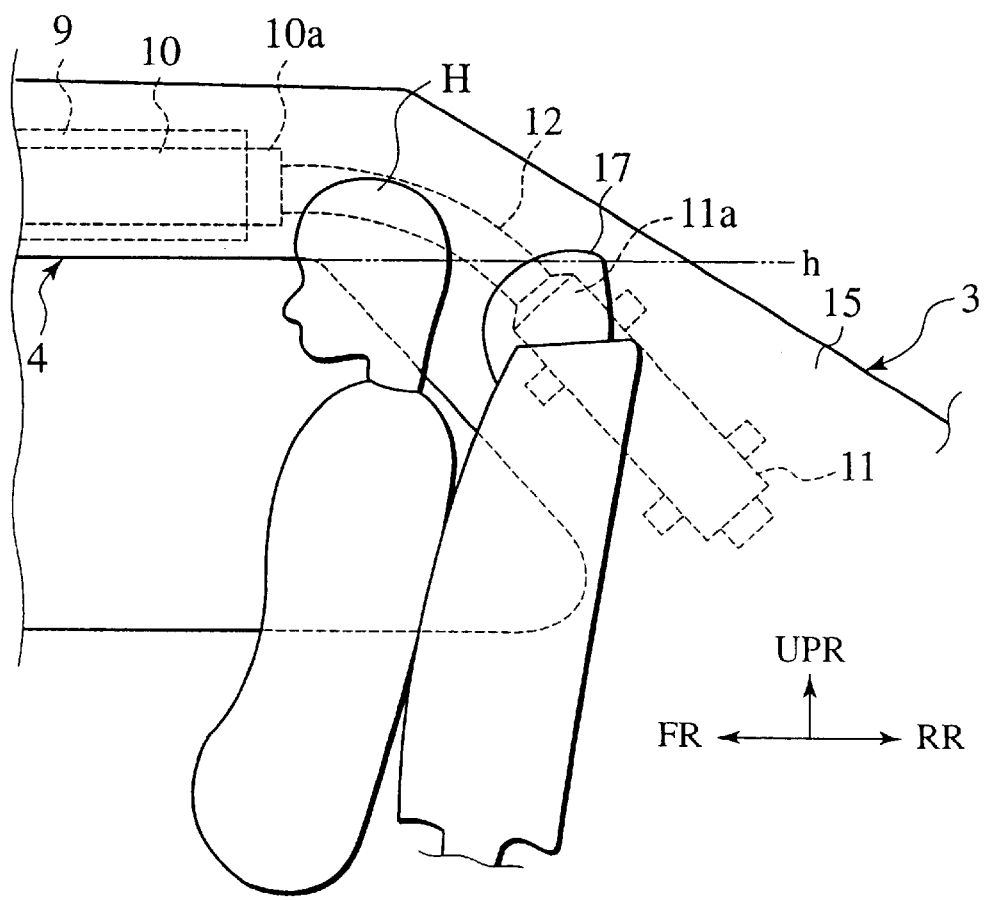
FIG. 2 is an enlarged side view showing a portion near a rear pillar in accordance with the embodiment.

As shown in FIGS. 1 and 2, a rear end portion 10a of the air bag main body 10 is formed in a narrow cylindrical shape so as to be protruded rearward from cover 9, and is connected to an inflator 11 generating a combustion gas for inflating the air bag main body through a metal pipe member 12 corresponding to a gas communication member.

With respect to the side roof rail 4, as shown in FIG. 4, the cover 9 receiving the air bag main body 10 is covered by a roof side trim 13 at the side of the occupant room R. An end portion of the roof side trim 13 is connected to a head lining 14.

Figure 5:
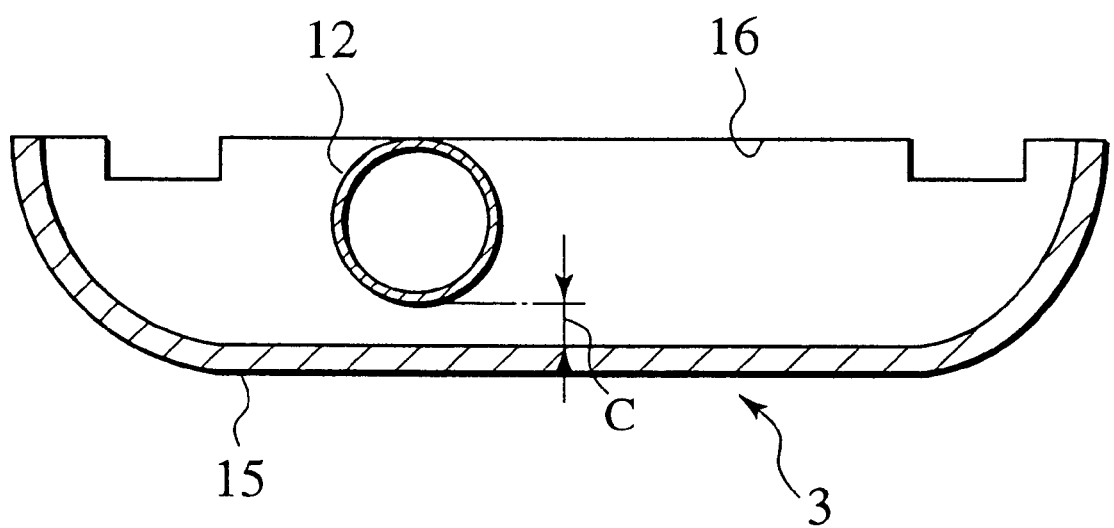
FIG. 5 is a cross sectional view taken along a line V—V in FIG. 1.

With respect to the rear pillar 3, as shown in FIGS. 1 and 5, the pipe member 12 and the inflator 11 are covered by another pillar garnish 15.

The inflator 11 is formed in a rigid metal cylindrical shape, and fixed to a pillar inner panel 16 in a state of being aligned with the rear pillar 3 in a longitudinal direction thereof. In other words, the inflator 11 has a longitudinal axis substantially aligned with or parallel to the longitudinal axis of a rear pillar 3. The inflator is arranged so that an upper end portion thereof is positioned below a head portion H of the occupant. In this case, the "occupant" corresponds to a size of AF05 to AM95 percentile in an Society of Automotive Engineers (SAE) mannequin. In particular, as shown in FIG. 2, the inflator 11 is arranged so that the upper end portion 11a thereof is positioned below a height h of eyes of the head portion H of the occupant, and is fixed to a position overlapping with the upper portion of a seat back 17 in a side view of the vehicle V. As shown, the inflator 11 has an upper end positioned lower than the a top portion of a seat back 17.

Here, a more detailed description will be given of the pipe member 12 corresponding to the gas communication member in accordance with the present embodiment.

The pipe member 12 arranged between the rear end portion 10a of the air bag main body 10 and the inflator 11 is made of a metal, formed in a cylindrical shape and curved so as to smoothly connect the air bag main body 10 positioned at the side of the side roof rail 4 and the inflator 11 positioned at the side of the rear pillar.

Figure 3:
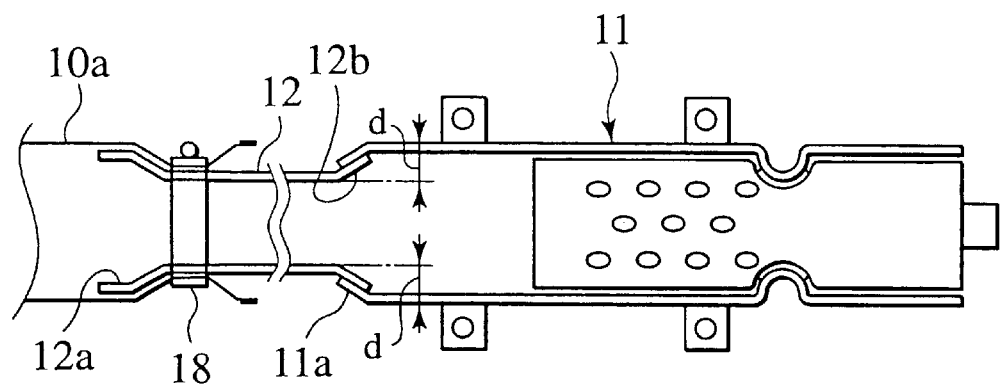
FIG. 3 is a cross sectional view showing an inflator and a pipe member in accordance with the embodiment.

As shown in FIG. 3, the pipe member 12 has a necked portion having a diameter formed between the end portions of the pipe member. In other words, the diameter of a substantial portion, if not substantially all, of pipe member 12 is contracted so as to have a necked portion smaller than that of the inflator 11.

The rear end portion 10a of the air bag main body 10 is connected to a front end portion 12a or diverging portion of the pipe member 12 by a metal fitting 18, and an opening of the upper end portion 11a of the inflator 11 is engaged with a rear end portion 12b or converging portion.

The diameter of the necked portion of the pipe member 12, can be optimized in correspondence to particular characteristics of the air bag main body 10 and air bag apparatus, as a whole, such as but not limited to a shape, a volume, and/or a folding arrangement of the connected air bag main body 10.

That is, it is possible to control an injection characteristic of a combustion gas of the inflator by suitably tuning the necking amount d of the pipe member 12. Accordingly, even in the case of employing various kinds of air bag main bodies different in the shape, the volume and the folded way, it is possible to correspond to the case only by modifying the pipe member 12 to a structure having a necking amount corresponding thereto, so that it is not necessary to replace the inflator 11 itself.

The pipe member 12 is arranged between the air bag main body 10 and the inflator 11 and at the position just corresponding to the head portion H of the occupant.

The pipe member 12 employs a metal cylindrical shape in the same manner as that of the inflator 11, however, in comparison with the inflator 11 structured so as to have a high rigidity so that gunpowder for the combustion gas can be stably sealed for a long time and a combustion gas having a high temperature and a high pressure can be injected in a predetermined direction, the pipe member 12 is structured so as to have a low rigidity and is capable of effectively deforming due to an excessive input from a side portion. Since the above-noted characteristics of pipe member 12 are based on an essential function that the pipe member 12 introduces the combustion gas having an injecting direction determined by the inflator 11 to the air bag main body 10, attention is paid to the matter that the rigidity itself can be relatively made lower as far as no substantial influence is given to the essential function.

As is representatively shown in FIG. 5, with respect to the rear pillar 3, the ribs or the like are not formed on the back surface in the pillar garnish 15 covering the pipe member 12, and a clearance C between the pipe member 12 and the pillar garnish 15 is set to be very small.

Next, a description is given of an operation in the side air bag apparatus in accordance with the present embodiment having the structure mentioned above.

At first, in the case that a sensor (not shown) detects a side collision of the vehicle, the combustion gas is correspondingly injected from the inflator 11 and is fed to the air bag main body 10 through the pipe member 12.

At this time, since the pipe member 12 is made of a metal, a temperature of the combustion gas is correspondingly reduced and an influence due to excessive heat applied to the air bag main body 10 can be restricted.

Next, when the combustion gas flows into the air bag main body 10, the air bag main body 10 starts inflating within the cover 9.

In this case, since the cover 9 is structured such that only the upper end portion thereof is mounted to the rail inner panel 5, the cover starts opening around the upper end portion corresponding to a hinge when the air bag main body 10 inflates within the cover 9.

At the same time, the air bag main body 10 develops downward from a portion between the lower end portion of the cover 9 and the rail inner panel 5 so as to form a curtain shape.

Next, the air bag main body 10 developed so as to form a curtain shape can restrain so as to protect the head portion H of the occupant moving forward.

Further, in addition, even in the case that the head portion H of the occupant is brought into contact with the pillar garnish 15 of the rear pillar 3 in place of the air bag main body 10 developed so as to form a curtain shape, the pipe member 12 arranged there is constructed by an easily deforming member having a low rigidity, so that an impact energy can be effectively absorbed due to a deformation of the pipe member 12.

As mentioned above, in the side air bag apparatus in accordance with the present embodiment, since the structure is made such that the pipe member 12 is provided and a high pressure gas is introduced to the air bag main body 10 by the pipe member 12, the ribs are not provided on the back surface of the pillar garnish 15. Accordingly, it is possible to reduce the clearance C between the pipe member 12 and the pillar garnish 15 so as to deploy the space of the occupant room R.

Further, since the inflator 11 having a high rigidity is in a state that the upper end portion thereof is covered by the seat back 17 from the side of the occupant room R, it is possible to effectively prevent the head portion H of the occupant from being interfered with the inflator 11.

Further, since the pipe member 12 is made of a metal, a temperature of the combustion gas can be correspondingly reduced, so that the influence applied to the air bag main body 10 can be restricted and a heat resisting level of a coating material applied to the inner portion thereof can be reduced. Accordingly, the air bag main body 10 can be made inexpensive.

Further, since it is possible to control an injecting characteristic of the combustion gas of the inflator 11, that is, an introducing characteristic of the high pressure gas to the air bag main body 10 by suitably tuning the necking amount d of the pipe member 12, it is not necessary to replace the inflator 11 itself even in the case of employing various kinds of air bag main bodies, so that it is possible to realize an effective structure.

In this case, in the present embodiment, the description is given of the embodiment in which the inflator 11 and the pipe member 12 are placed in the rear pillar 3, however, it is, of course, possible to apply to the other pillars in correspondence to the positions of the subject to be restrained, the kinds of the vehicles or the like.

Further, in the present embodiment, the pipe member 12 is formed in the metal cylindrical shape and the necking amount d is set by contracting the metal cylinder, however, of course, the shape of the pipe member 12 is not limited to the cylindrical shape, for example, a hollow square pillar shape can be employed, and the necking amount d may be set by suitably setting a distance between two opposing surfaces in correspondence to a cross sectional area, a flow passage length or the like required with respect to the passing high pressure gas.

Of course, the material of the pipe member 12 is not limited to the metal, and it is a matter of course that a resin material or the like can be employed as far as a necessary mechanical strength, thermal property and the like can be satisfied.

Further, in accordance with the present embodiment, the inflator 11 is structured such that the combustion gas is generated with employing an agent, however, it is possible to employ a gas combustion type, a high pressure gas sealing type or the like.

Although the invention has been described above by reference to a certain embodiment of the invention, the invention is not limited to the embodiment described above. Modifications and variations of the embodiment described above will occur to those skilled in the art, in light of the teachings. The scope of the invention is defined with reference to the following claims.

What is claimed is:

1. A side air bag apparatus of a vehicle comprising:

an air bag main body adapted to be mounted along an inner side of a vehicle cabin from a vehicle rear pillar to a side roof rail in a folded state and capable of being deployed downward;

an inflator having an upper end that is adapted to be mounted to the vehicle rear pillar such that a longitudinal axis of the inflator is substantially aligned along a longitudinal axis of the vehicle rear pillar and that is adapted to inject a gas into and inflate the air bag main body such that the air bag main body unfolds downward wherein the upper end of the inflator is adapted to be mounted such that it has a position that is lower than a top of a vehicle seat back; and a gas communication member extending from the upper end of the inflator to the air bag main body that is, during a side collision, adapted to introduce the gas from the inflator into the air bag main body and that is capable of being deformed when impacted by an external force related to the side collision, wherein the gas communication member has a converging portion at a proximal end adjacent the upper end of the inflator and a diverging portion at a distal end adjacent the air bag main body defining a necked portion of substantially constant cross-section therebetween.

2. A side air bag apparatus of a vehicle according to claim 1, wherein the air bag main body is developed downward so as to form a curtain shape.

3. A side air bag apparatus of a vehicle according to claim 1, wherein the inflator and the gas communication member are covered by a pillar garnish from the inner side of a vehicle cabin.

4. A side air bag apparatus of a vehicle according to claim 1, wherein the gas communication member is a metal pipe member.

5. A side air bag apparatus of a vehicle according to claim 1, wherein the gas communication member connects the inflator and the air bag main body to each other in a curved manner.

6. A side air bag apparatus of a vehicle according to claim 1, wherein the inflator generates the gas and the gas is introduced into the air bag main body through the gas communication member.

7. A side air bag apparatus of a vehicle according to claim 1, wherein the necked portion controls an injection flow rate of the gas.

8. A side air bag apparatus of a vehicle according to claim 7, wherein the necked portion is a contracted portion of the gas communication member.

9. A side air bag apparatus of a vehicle according to claim 1, wherein an upper end portion of the inflator is set to a position substantially overlapping with a seat back in a side view of the vehicle.

10. A side air bag apparatus of a vehicle comprising:

an air bag main body adapted to be arranged along an inner side of a vehicle cabin extending from a rear pillar to a side roof rail in a folded state and that is capable of being deployed downward;

an inflator adapted to inject a gas and to inflate the air bag main body so as to deploy the air bag main body downward, an upper end of the inflator being positioned lower than a top of a seat back, wherein the inflator is adapted to be arranged along the rear pillar such that a longitudinal axis thereof is substantially aligned with a longitudinal axis of the rear pillar; and gas communication means capable of introducing the gas injected from the inflator to the air bag main body and capable of being deformed due to an excessive input, which is related to a side collision, from an external portion thereof, wherein the gas communication member has a converging portion at a proximal end adjacent the upper end of the inflator and a diverging portion at a distal end adjacent the air bag main body defining a necked portion of substantially constant cross-section therebetween.

11. A side air bag apparatus for a vehicle having a side roof rail, a center pillar, a rear pillar, and a seat back, the air bag apparatus comprising:

an air bag main body folded and adapted to be mounted to the side roof rail of the vehicle;

an inflator, which has an upper end, adapted to be mounted to the rear pillar such that a longitudinal axis thereof is substantially parallel to a longitudinal axis of the rear pillar and such that its upper end is disposed at a position that is lower than a top of the seat back; and a gas communication member that extends from the inflator to the air bag main body and that is adapted to transmit gas from the inflator to the air bag main body during a side impact collision such that the air bag main body unfolds downward, wherein the gas communication member has a converging portion at a proximal end adjacent the upper end of the inflator and a diverging portion at a distal end adjacent the air bag main body defining a necked portion of substantially constant cross-section therebetween.

12. A side air bag apparatus as claimed in claim 11, wherein the gas communication member comprises a metal.

13. A side air bag apparatus as claimed in claim 11, wherein the gas communication member is curved.

14. A side air bag apparatus as claimed in claim 11, wherein the necked portion controls the flow rate of the gas from the inflator to the air bag main body during a side vehicle impact.

* * * * *